(12) United States Patent
Spartz et al.

(10) Patent No.: US 6,785,549 B2
(45) Date of Patent: Aug. 31, 2004

(54) METHOD AND APPARATUS FOR MATCHING OPERATING REVISIONS OF A MOBILE STATION AND A BASE STATION IN A WIRELESS DATA COMMUNICATION SYSTEM

(75) Inventors: Michael Kevin Spartz, San Diego, CA (US); Francesco Grilli, San Diego, CA (US); Lorenzo Casaccia, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 84 days.

(21) Appl. No.: 10/183,941

(22) Filed: Jun. 26, 2002

(65) Prior Publication Data

US 2004/0002338 A1 Jan. 1, 2004

(51) Int. Cl.[7] .......................... H04Q 7/20; H04M 3/00
(52) U.S. Cl. ................ 455/450; 455/450; 455/418; 455/440; 455/435.1; 455/439; 370/329; 370/310; 370/460; 370/465
(58) Field of Search ............................ 455/450, 418, 455/456.5, 436, 435.1, 432.1, 439, 441; 370/465, 329, 310

(56) References Cited

U.S. PATENT DOCUMENTS

| | | | | |
|---|---|---|---|---|
| 5,926,469 A | * | 7/1999 | Norstedt et al. | 370/329 |
| 6,308,061 B1 | * | 10/2001 | Criss et al. | 455/418 |
| 6,314,292 B1 | * | 11/2001 | Ho et al. | 455/450 |
| 6,353,620 B1 | * | 3/2002 | Sallberg et al. | 370/465 |

* cited by examiner

*Primary Examiner*—Nguyen T. Vo
*Assistant Examiner*—Randy Peaches
(74) *Attorney, Agent, or Firm*—Philip R. Wadsworth; Thien T. Nguyen; S. Hossain Beladi

(57) ABSTRACT

Various method and apparatus provides for matching revision levels used by a mobile station (102–104) and a base station (101, 160) for establishing a communication link. The mobile station repeats, for a number of times, the transmission of a request for establishing a communication link between the mobile station and the base station. The mobile station detects failure of establishing the communication link with the first revision level based on repeating the request for the number of times. The mobile station changes the first revision level to the second revision level at the mobile station for establishing the communication link.

4 Claims, 5 Drawing Sheets

METHOD AND APPARATUS FOR MATCHING OPERATING REVISIONS OF A MOBILE STATION AND A BASE STATION IN A WIRELESS DATA COMMUNICATION SYSTEM

FIELD

The present invention relates generally to the field of communications, and more particularly, to wireless communications.

BACKGROUND

A system of protocols normally controls the ways a mobile station and a base station may operate in a communication system. Such protocols are disclosed in a set of standards published by a recognized standard body. Different releases of the standards are made while improving the available communication features in each new release. In one aspect, for a mobile station to benefit from the improved features of a new release, the network and the mobile station need to be updated with software or hardware or both. The updated mobile station then may use the communication protocols outlined in the new release of the standard. The base station, recognizing capability of the mobile station, communicates with the mobile station in accordance with the new release of the standard. While a base station is yet to be updated to offer communication services in accordance with the protocols of the new standard, one or more mobile stations in the communication system may have been updated to receive communication services in accordance with the protocol of the new release of the standard. In such a case, the base station may ignore or deny communication services to the updated mobile station. Therefore, there is a need to provide communication services from a base station operating in accordance with an older release of the standard to an updated mobile station.

SUMMARY

Various method and apparatus provides for matching revision levels used by a mobile station and a base station for establishing a communication link. The mobile station transmits a request for establishing the communication link with the base station, and transmits a first location update message including a classmark information for indicating a first revision level used by the mobile station for communication with the base station. The base station detects whether the first revision is incompatible with a second revision level used by the base station. The first revision level may be an updated revision level, and the second revision level may be an older revision level. The base station may ignore the request for establishing the communication link between the mobile station and the base station. The mobile station repeats, for a number of times, the transmission of the request for establishing the communication link between the mobile station and the base station. The mobile station detects failure of establishing the communication link with the first revision level based on repeating the request for the number of times. The request may be repeated four times. The mobile station changes the first revision level to the second revision level at the mobile station. The mobile station repeats, at least one more time, the transmission of the request for establishing the communication link between the mobile station and the base station and transmitting a second location update message including the classmark information for indicating the second revision level used by the mobile station for communication with the base station. The base station, as a result, detects compatible revision levels used by the base station and the mobile station, and releases a channel for establishing the communication link. As a result, the operating revisions at the mobile station and the base station are matched for further communications.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Generally stated, various aspects of the invention provide for efficient use of communication resources in a communication system by efficiently matching the revision level of a mobile station and a base station for providing communication services. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all incorporated by reference herein. A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Figure 1:
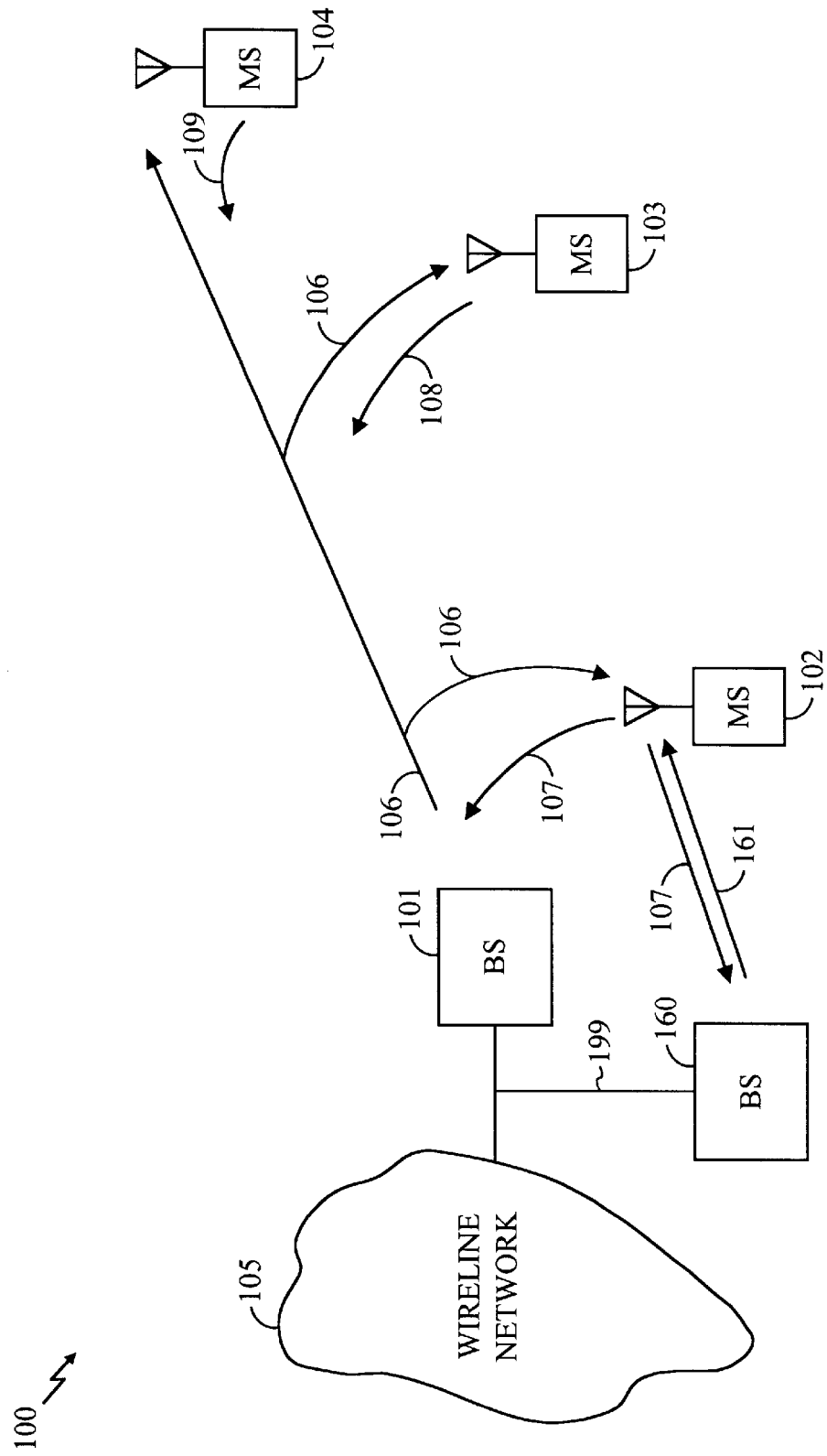
FIG. 1 illustrates a communication system capable of operating in accordance with various embodiments of the invention.

FIG. 1 illustrates a general block diagram of a communication system 100 capable of operating in accordance with any of the code division multiple access (CDMA) communication system standards and GSM standard while incorporating various embodiments of the invention. Communication system 100 may be for communications of data, or data and voice. Generally, communication system 100 includes a base station 101 that provides communication links between a number of mobile stations, such as mobile stations 102–104, and between the mobile stations 102–104 and a public switch telephone and data network 105. Base station 101 may include a number of components, such as a base station controller and a base transceiver system. For simplicity, such components are not shown.

Base station 101 may be in communication with other base stations, for example base station 160. A mobile switching center (not shown) may control various operating aspects of the communication system 100 and in relation to communications over a back-haul 199 between network 105 and base stations 101 and 160. Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the received information. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107-109 for mobile stations 102–104, respectively. The reverse link signals 107-109, although may be targeted for one base station, may be received at other base stations. A base station may be updated in accordance with a new release of the standard in several stages. At each stage, a component, such the controller and base transceiver system, may be updated. After all components are updated, the base station may provide the communication services in accordance with the new release of the standard. In the mean time, an updated mobile station may roam into the coverage area. Various aspects of the invention provide for the mobile station and the base station to match an operating revision level before establishing a communication service.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station.

In accordance with various aspects of the invention, in communication system 100, an updated mobile station, such as mobile stations 102–104, begins establishing a communication call with a base station, such as base stations 101 and 160, in accordance with the protocols of the updated release of the standard. After several attempts to establish a communication link without success, the mobile station changes the operating parameters for establishing the link to a revision level of the standard that is older than the updated release, in accordance with various aspects of the invention.

Figure 2:
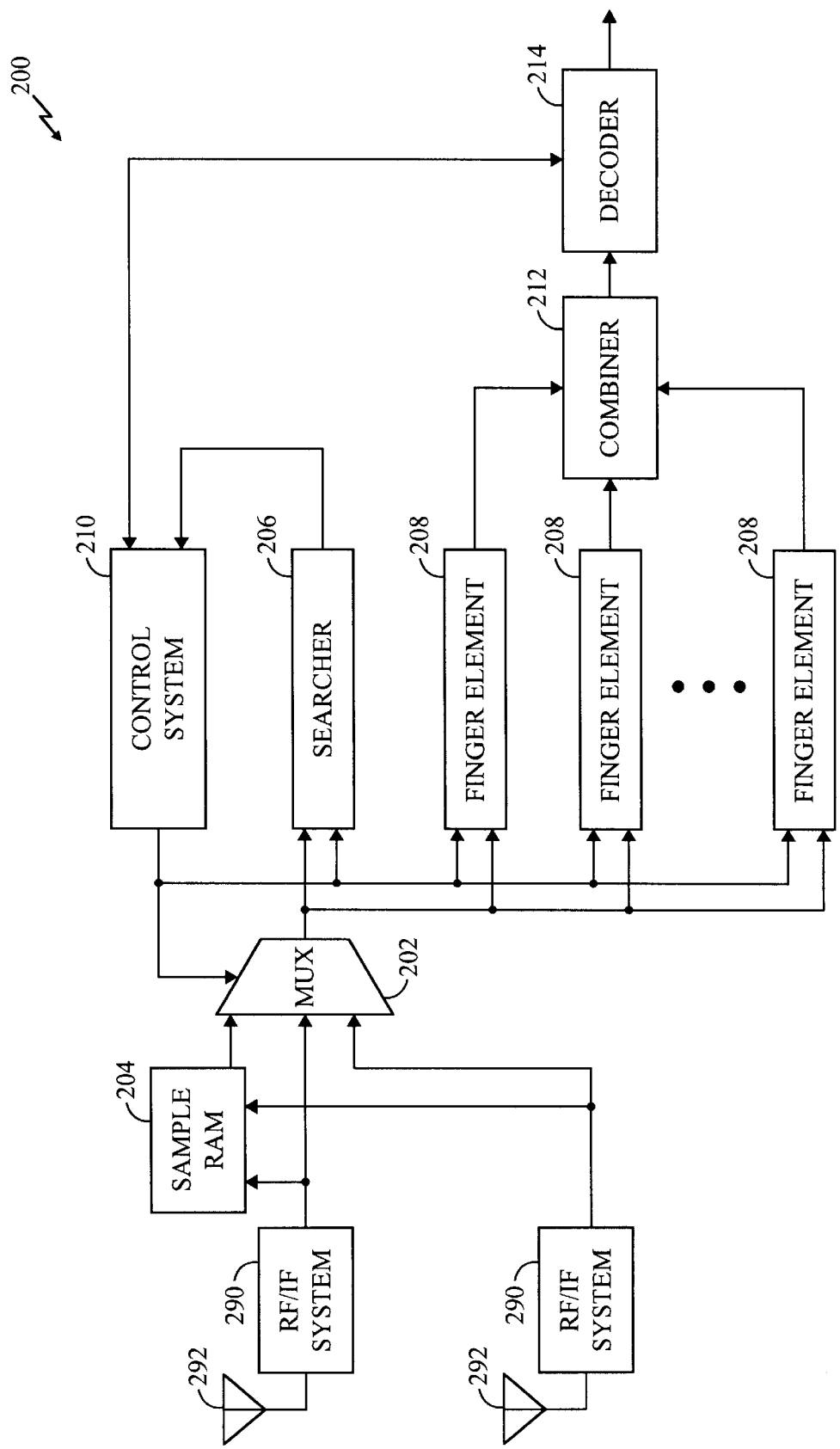
FIG. 2 illustrates a receiver system for receiving and decoding various channels, and capable of operating in accordance with various aspects of the invention.

FIG. 2 illustrates a block diagram of a receiver 200 used for processing and demodulating the received signal. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. Multiple received signals propagated through different propagation paths may be from a common source. Antenna system 292 receives the RF signals, and passes the RF signals to RF/IF system 290. RF/IF system 290 may be any conventional RF/IF receiver. The received RF signals are filtered, down-converted and digitized to form RX samples at base band frequencies. The samples are supplied to a multiplexer (mux) 202. The output of mux 202 is supplied to a searcher unit 206 and finger elements 208. A control unit 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to mux 202. Mux 202 supplies the samples to searcher unit 206 and finger elements 208. Control system 210 configures finger elements 208 to perform demodulation and despreading of the received signal at different time offsets based on search results from searcher unit 206. The results of the demodulation are combined and passed to decoder 214. Decoder 214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 200 may be used in a receiver portion of base stations 101 and 160 for processing the received reverse link signals from the mobile stations, and in a receiver portion of any of the mobile stations for processing the received forward link signals.

Figure 3:
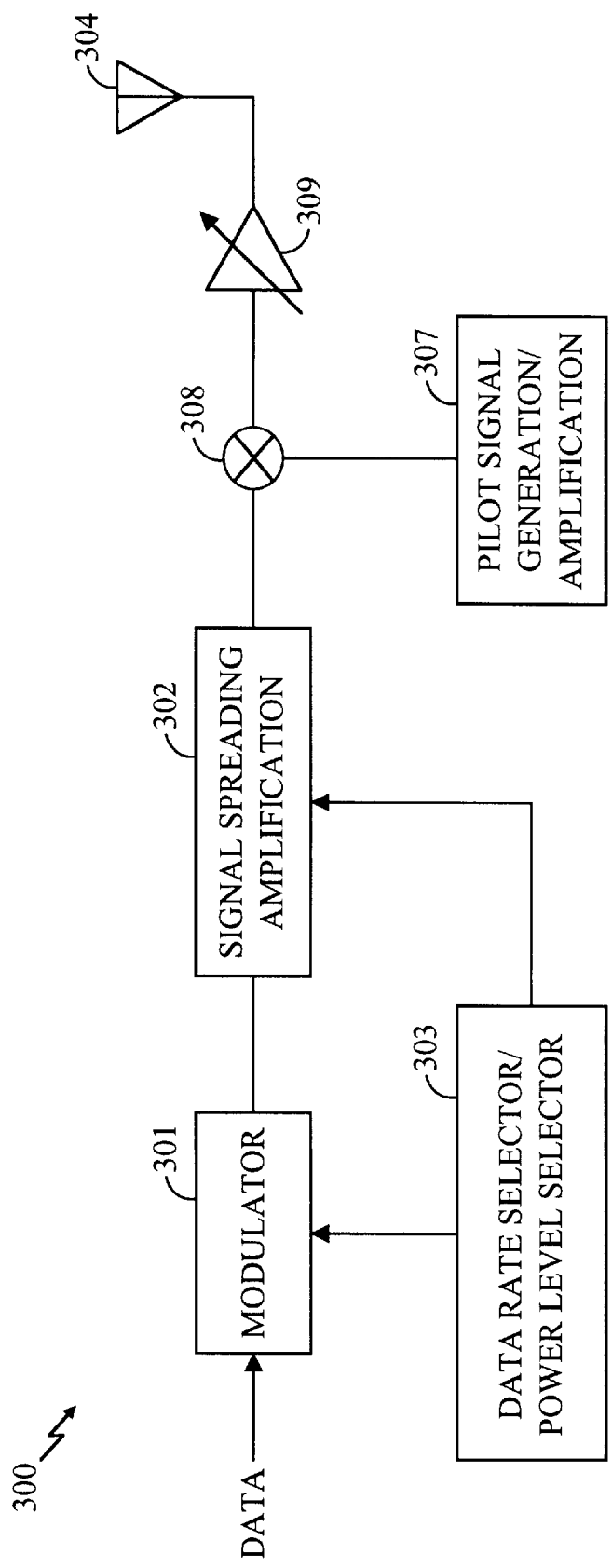
FIG. 3 illustrates a transmitter system for transmitting various channels, and capable of operating in accordance with various aspects of the invention.

FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
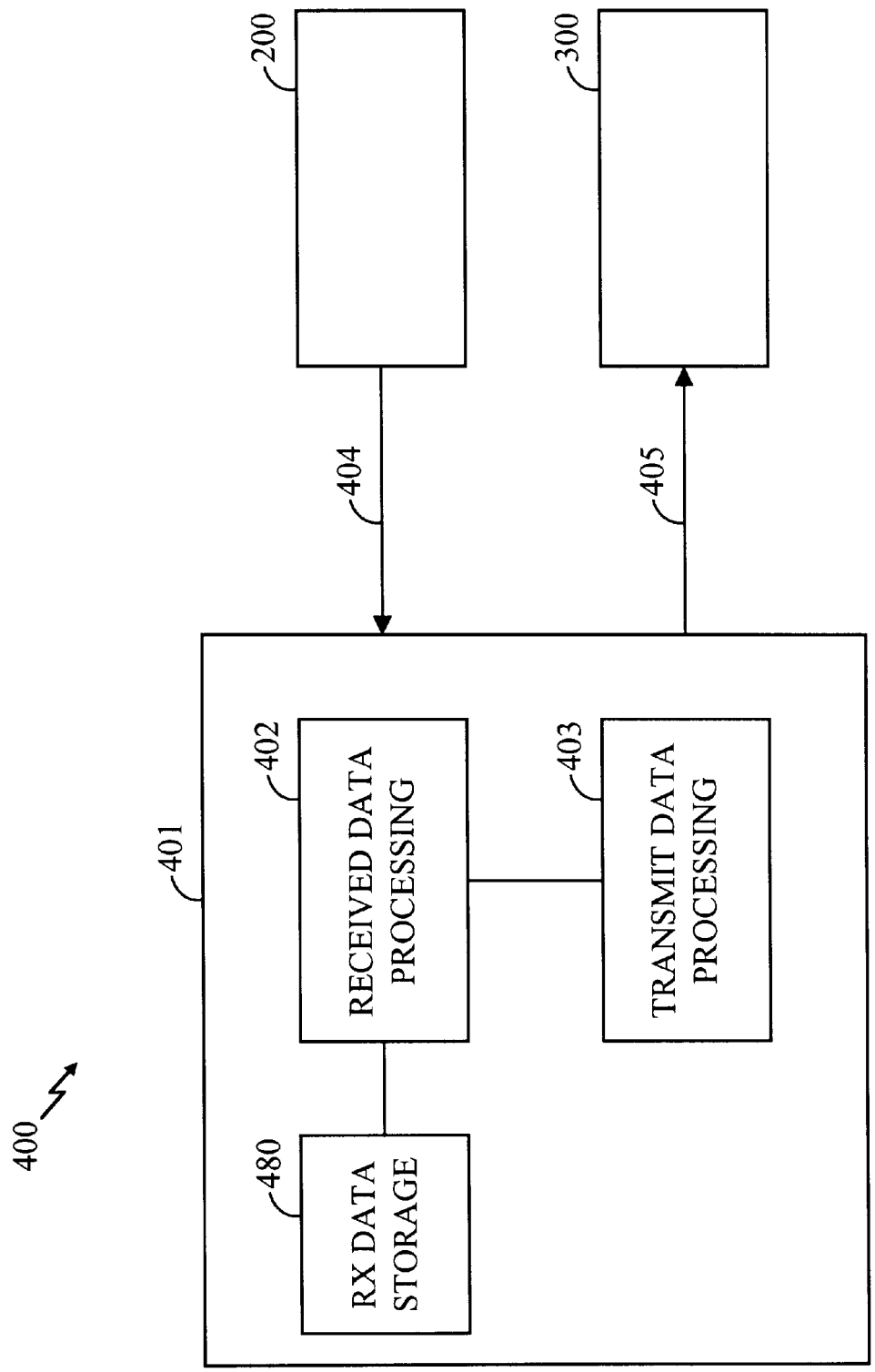
FIG. 4 illustrates a transceiver system for receiving and transmitting various channels, and capable of operating in accordance with various aspects of the invention.

FIG. 4 depicts a general diagram of a transceiver system 400 for incorporating receiver 200 and transmitter 300 for establishing and maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting. Transmitter 300 receives the data for transmission on input 405. Transmit data processing block 403 prepares the data for transmission on a transmit channel. Received data, after being decoded in decoder 214, are received at processor 401 at an input 404. Received data are processed in received data processing block 402 in processor 401. The processing of the received data generally includes determining the revision level of the communications from the source. For example, the source may be a mobile station communicating in accordance with an updated revision of the protocols. If the revision level of the standard used by the mobile station does not match the revision level used by the base station, the processor 401 may simply ignore the received data from the mobile station. After several attempts to establish a communication link, the mobile station in accordance with various aspects of the invention may change the revision level of the standard to an older revision level, and start establishing the communication link. The processor 401, this time, recognizing a matching revision level, responds to the received data from the mobile station. The communication link may continue in accordance with the matched revision level. As such, the control system 210 and processor 401 may be used for performing various aspects of the invention. A receive data storage unit 480 may be utilized to store the received packets of data. Various operations of processor 401 may be integrated in a single or multiple processing units. The transceiver 400 may be connected to another device. The transceiver 400 may be an integral part of the device. The device may be a computer or operates similar to a computer. The device may be connected to a data network, such as Internet. In case of incorporating the transceiver 400 in a base station, the base station through several connections may be connected to a network, such as Internet.

Figure 5:
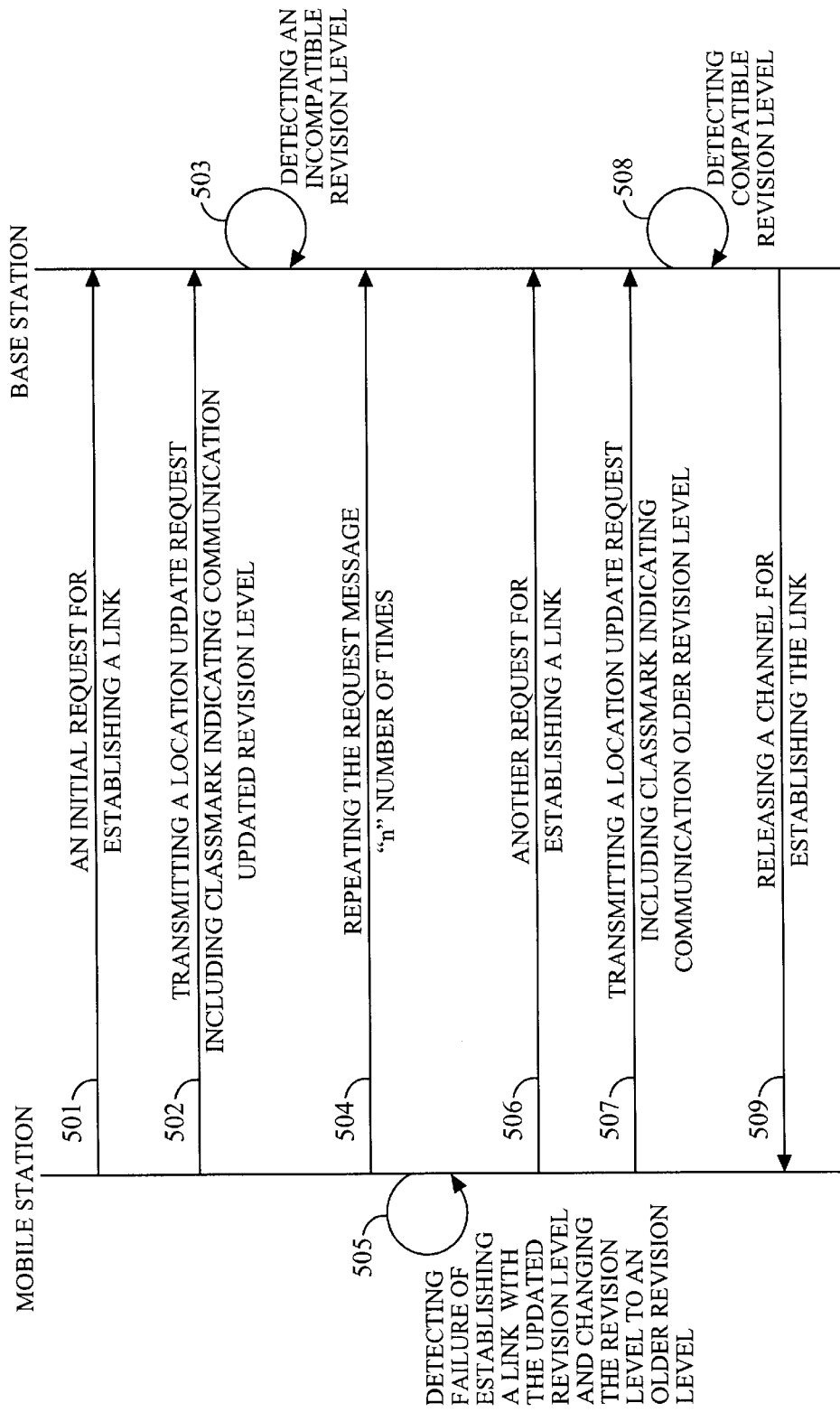
FIG. 5 illustrates a message flow between a mobile station and a base station for establishing a communication service in accordance with various aspects of the invention.

FIG. 5 illustrates a flow diagram 500 of various steps and messages communicated between a mobile station and a base station for matching the communication protocol revision level for establishing a communication link. At a step 501, a mobile station, such as mobile stations 102–104, may make an initial request for establishing a communication link with a base station, such as base stations 101 and 160, in communication system 100. A transmitter, such as transmitter 300 may be used for transmissions from the mobile station. The base station may receive the communication from the mobile station. The mobile station at step 502 also transmits a location update request message that includes a classmark information. The classmark information indicates the revision level that the mobile station is using for communication with the base station. The revision level may be an updated revision level that does not match the revision level used by the base station. At step 503, the base station detects an incompatible revision level. The base station may ignore the communications from the mobile station made at step 501 for establishing a communication call. The mobile station repeats the request a number of times at step 504. The base station ignores the received request. After repeating the request a number of times, such as four times, the mobile station at step 505 may detect failure of establishing a link with the updated revision level based on reaching the maximum allowed number of repeating the request. The mobile station changes the revision level to an older revision level. At step 506, the mobile station makes another request for establishing a communication link with the base station. At the next step 507, the mobile station also transmits a location update request message including the classmark indicating communications in accordance with the older revision level. At step 508, the base station detects a compatible revision level. At step 509, the base station releases a channel for establishing the communication link with the mobile station.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for use in a communication system, comprising:

transmitting a request for establishing a communication link between a mobile station and a base station;

transmitting, from said mobile station, a first location update message including a classmark information for indicating a first revision level used by said mobile station for communication with said base station;

detecting, at said base station, said first revision is incompatible with a second revision level used by said base station and ignoring said request for establishing said communication link between said mobile station and said base station;

repeating, for a number of times, said transmission of said request for establishing said communication link between said mobile station and said base station;

detecting, at said mobile station, failure of establishing said communication link with said first revision level based on repeating said request said number of times;

changing said first revision level to said second revision level at said mobile station;

repeating, at least one more time, said transmission of said request for establishing said communication link between said mobile station and said base station and transmitting a second location update message including said classmark information for indicating said second revision level used by said mobile station for communication with said base station.

2. The method as recited in claim 1 further comprising:

detecting, at said base station, compatible revision levels used by said base station and said mobile station;

releasing a channel for establishing said communication link.

3. An apparatus for use in a communication system, comprising:

a first controller and a first transceiver system, at a mobile station, configured for transmitting a request for establishing a communication link between said mobile station and a base station, for transmitting, from said mobile station, a first location update message including a classmark information for indicating a first revision level used by said mobile station for communication with said base station, for repeating, for a number of times, said transmission of said request for establishing said communication link between said mobile station and said base station, for detecting, at said mobile station, failure of establishing said communication link with said first revision level based on repeating said request said number of times, for changing said first revision level to a second revision level at said mobile station, for repeating, at least one more time, said transmission of said request for establishing said communication link between said mobile station and said base station and transmitting a second location update message including said classmark information for indicating said second revision level used by said mobile station for communication with said base station.

4. A method for use in a mobile station for matching revision levels used by said mobile station and a base station in a communication system, comprising:

transmitting a request for establishing a communication link between said mobile station and said base station;

transmitting, from said mobile station, a first location update message including a classmark information for indicating a first revision level used by said mobile station for communication with said base station;

repeating, for a number of times, said transmission of said request for establishing said communication link between said mobile station and said base station;

detecting, at said mobile station, failure of establishing said communication link with said first revision level based on repeating said request said number of times;

changing said first revision level to a second revision level at said mobile station;

repeating, at least one more time, said transmission of said request for establishing said communication link between said mobile station and said base station and transmitting a second location update message including said classmark information for indicating said second revision level used by said mobile station for communication with said base station, thereby matching revision levels used by said mobile station and said base station in said communication system.

* * * * *